United States Patent [19]

Shupert

[11] 4,311,204
[45] Jan. 19, 1982

[54] MOTOR VEHICLE WITH RESILIENT CUSHIONS BETWEEN ITS BODY AND MAIN FRAME STRUCTURES

[75] Inventor: Paul T. Shupert, Milwaukee, Wis.
[73] Assignee: Allis-Chalmers Corporation, Milwaukee, Wis.
[21] Appl. No.: 106,682
[22] Filed: Dec. 26, 1979
[51] Int. Cl.³ .................... B62D 27/04; A01D 35/00
[52] U.S. Cl. .................................. 180/54 R; 56/14.7; 180/85; 180/89.1; 267/63 R; 248/632; 248/634; 296/35.1
[58] Field of Search ................. 180/54 F, 54 R, 89.1, 180/85; 296/35.1; 267/63 R; 248/634, 633, 632; 56/DIG. 22, 14.7, 17.4

[56] References Cited

U.S. PATENT DOCUMENTS

| | | | |
|---|---|---|---|
| 3,789,945 | 2/1974 | Hansen | 296/35.1 X |
| 3,795,094 | 3/1974 | Mollen et al. | 56/DIG. 22 |
| 3,951,223 | 4/1976 | Kamlukin | 180/54 D X |

FOREIGN PATENT DOCUMENTS 672163  2/1939  Fed. Rep. of Germany .... 267/63 R

*Primary Examiner*—Richard A. Bertsch
*Assistant Examiner*—Milton L. Smith
*Attorney, Agent, or Firm*—Charles L. Schwab

[57] ABSTRACT

The body structure 12 of a rear engine riding mower 11 is resiliently mounted on a main frame structure 13 by four cushion mounts 14. The engine 48 and steering shaft are mounted on the main frame structure 13 and the operator's seat 53 is supported on the body structure 12. Each of the mounts 14 is provided with a restrainer in the form of an inverted cup 69 which serves to stiffen the mount when the body structure 12 shifts horizontally (see FIG. 6) relative to the main frame structure 13 and when unusual vertical loading (see FIG. 7) is imposed on the mount.

3 Claims, 8 Drawing Figures

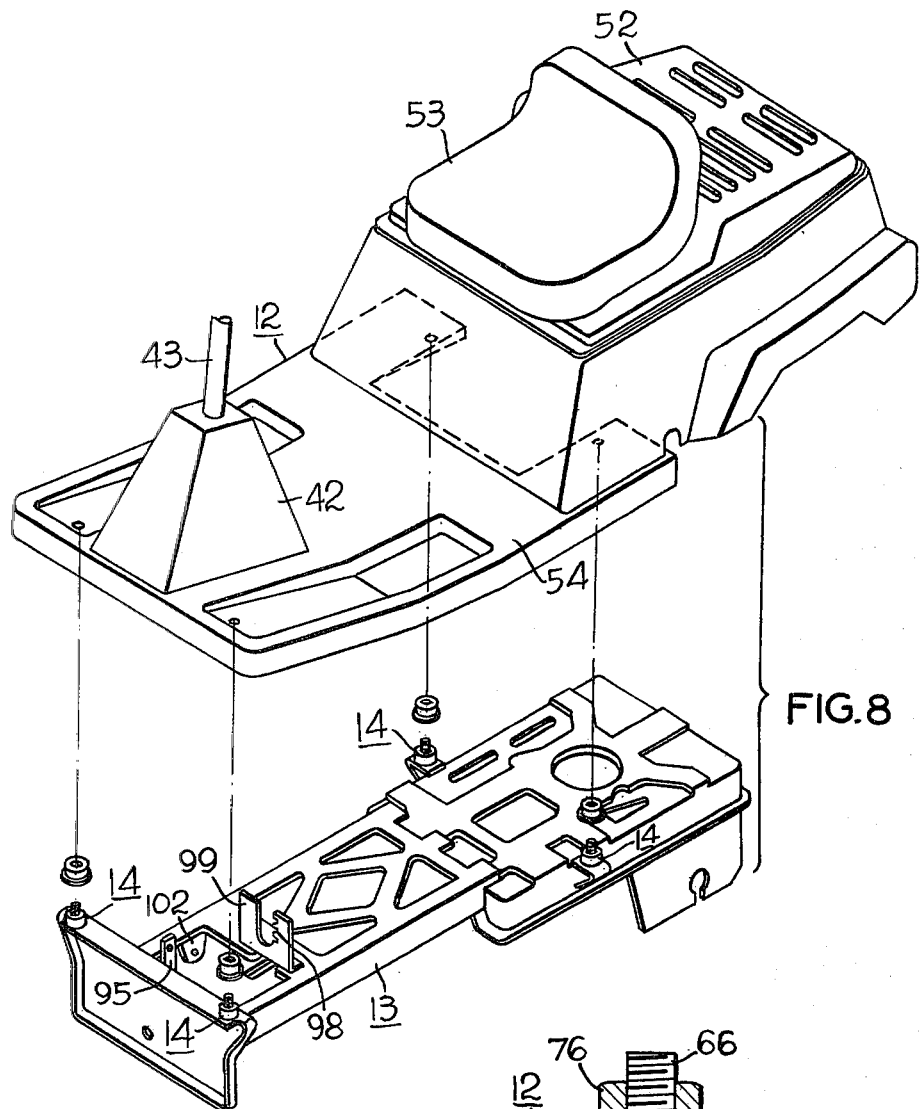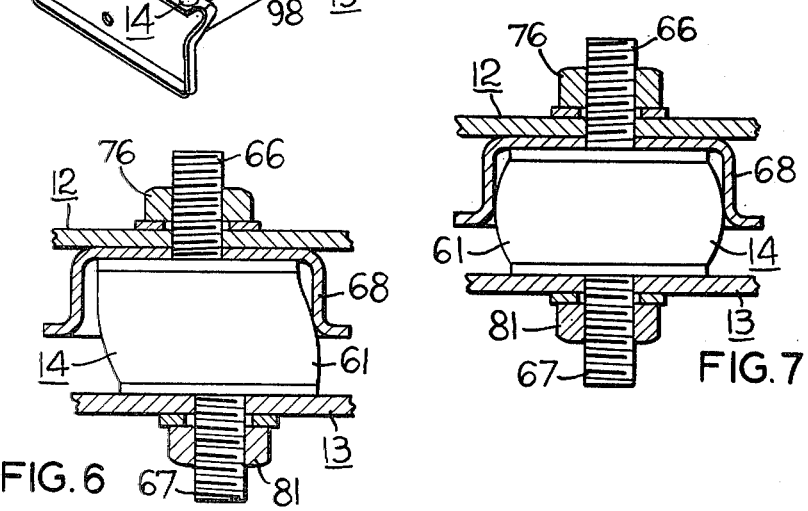

MOTOR VEHICLE WITH RESILIENT CUSHIONS BETWEEN ITS BODY AND MAIN FRAME STRUCTURES

TECHNICAL FIELD OF THE INVENTION

This invention relates to cushioning the vehicle body structure occupied by the operator relative to the main frame structure on which the engine is mounted to isolate the operator from the engine and suspension vibrations.

BACKGROUND OF THE INVENTION

Heretofore others have used cushioning means to isolate the operator's station from the vehicle main frame vibrations, such as is shown in U.S. Pat. Nos. 2,564,888; 3,438,672; 3,732,941; 3,741,329; 3,781,058; 3,797,604; and 3,831,704. U.S. Pat. No. 2,165,702 shows a resilient mount for heavy duty applications wherein the cushion body is subjected to vertical shear and radial compression stresses. U.S. Pat. No. 3,826,530 shows an operator's seat supported on resilient shock members.

BRIEF DESCRIPTION OF THE INVENTION

The main body structure of a motor vehicle is cushioned relative to a main frame structure on which the engine and wheels are mounted by cushion support means including a first pair of laterally spaced cushion mounts between the front parts of the body and main frame structures and a second pair of laterally spaced cushion mounts between the rear parts of the body and main frame structures. Each mount has an upright cylindrical cushion of resilient rubber-like material, upper and lower horizontal plates bonded to the top and bottom of the upright cylinder and a restrainer (which may take the form of a cup) mounted on one of the structures presenting wall means in horizontally confronting relation to the outer cylindrical surface of the cylindrical cushion. The wall means extend vertically alongside a substantial portion of the height of the cushion and contact the latter to resist lateral shifting movement of the body structure relative to the main frame structure and to also limit radial expansion of the cushion when the latter is subjected to predetermined vertical loading.

The invention has particular application to a rear engine riding mower and the function of the rear mounts is believed to be optimized by positioning them vertically below the seat on the body structure. The steering wheel shaft may have a sliding fit with a pedestal for the steering column so as to permit the body structure to move vertically relative to the steering wheel and its shaft.

BRIEF DESCRIPTION OF THE DRAWINGS

One embodiment of the invention is illustrated in the drawings in which:

FIG. 6 is a view similar to FIG. 5 but showing the cushion mount when subjected to side sway of the body structure of the vehicle;

FIG. 7 is a view showing the configuration of the cushion mount when subjected to severe vertical loading; and FIG. 8 is an exploded view of the body and main frame structure and the cushion mounts therebetween.

DETAILED DESCRIPTION OF THE DRAWINGS

Figure 1:
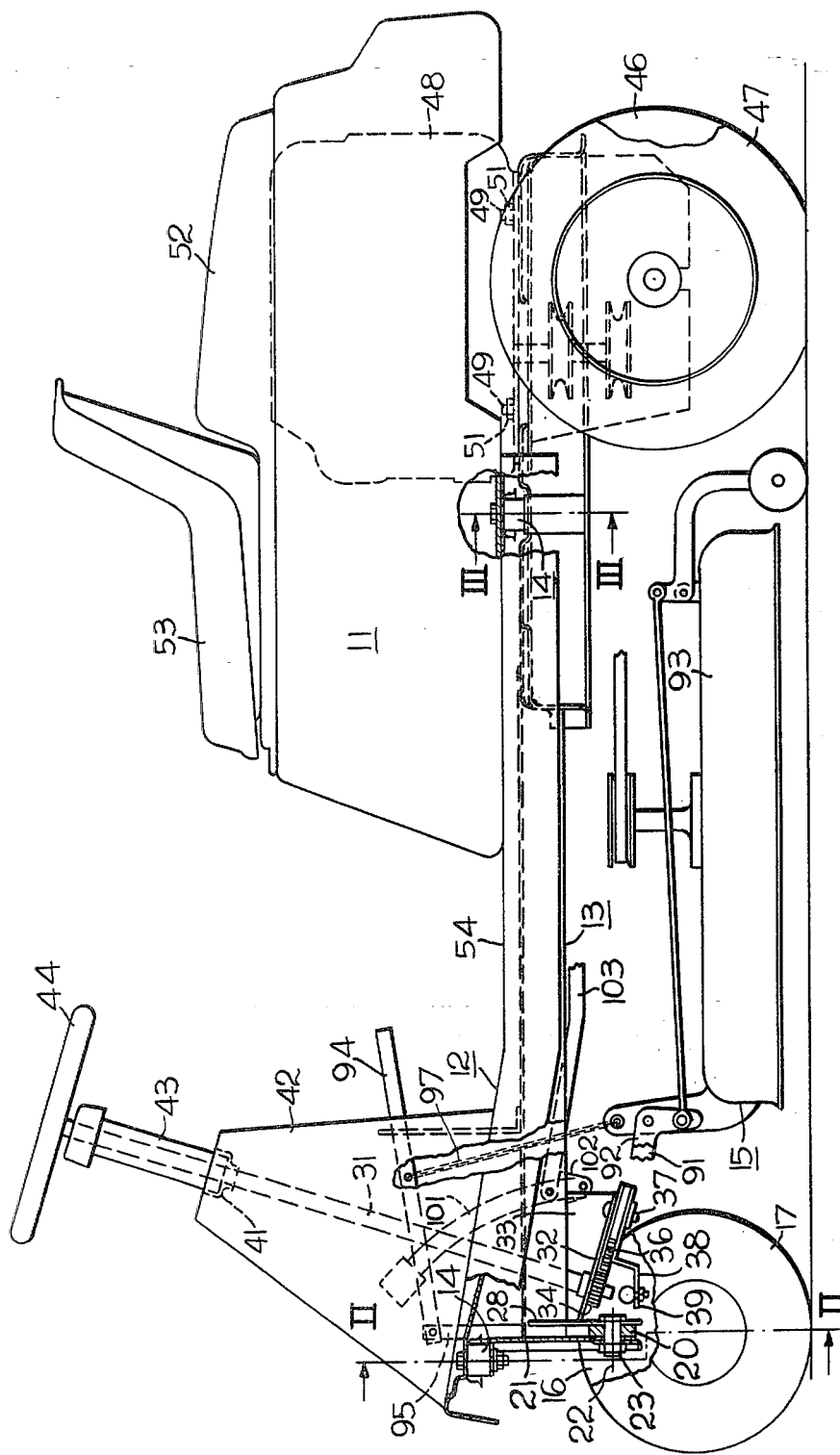
FIG. 1 is a side view of a rear engine riding lawn mower with parts broken away for illustration purposes.

Referring to FIGS. 1, 2, 3 and 8, a motor vehicle in the form of a rear engine riding lawn mower 11 has a body structure 12 cushion mounted on a main frame structure 13 by four cushion mounts 14. A rotary mower attachment 15 is disposed beneath the main frame structure 13 and is connected through laterally spaced links 91, 92 to a front axle 20 by a draft connection, not shown. The mower housing 93 is raised and lowered by a control lever 94, pivoted to a bracket 95 rigidly secured to the main frame structure 13. A chain 97 interconnects the lever 94 and the mower housing 93. The lever 94 has a portion which cooperates with one of a plurality of notches 98 in an upstanding bracket 99 rigidly secured to the main frame structure 13. The main frame structure 13 is supported at its front end by a pair of steerable wheels 16, 17, the spindles 18, 19 for which are journaled on laterally opposite ends of a transverse axle 20 on steering axes 57, 58. The axle 20 is pivoted to a vertically disposed front wall 21 and a vertical bracket 28 of the main frame structure 13 on a longitudinal oscillating axis 22 by a pivot pin 23. A steering shaft 31 is rotatably journaled and supported on a transversely extending wall 32 of a bracket 33 of the main frame structure 13 and presents a gear 34 at its lower end meshing with a gear segment 36 pivoted to the bracket 33 by a pin 37. A steering arm 38 is secured to the gear segment 36 and is connected through a suitable linkage 39 to steering arms 40, 40' on the spindles 18, 19. The upper portion of the steering shaft 31 is rotatably and slidably supported in a sleeve 41 on a pedestal or support 42 for the steering column 43. A manually manipulated steering wheel 44 is secured to the upper end of the steering shaft 31 in a conventional manner. A clutch lever 101, which extends through a slot, not shown, in the body structure 12, is pivotally supported on a bracket 102 rigidly secured to the main frame structure 13 and is operatively connected to a clutch mechanism, not shown, by a rearwardly extending link 103.

A pair of nonsteerable drive wheels 46, 47 support the rear end of the main frame structure 13 and are driven by an engine 48 rigidly secured to the top of the rear part of the main frame structure 13 by bolts 49 and nuts 51. The transmission gear interconnecting the engine 48 and the drive wheels 46, 47 is not shown.

The body structure 12 includes a combined seat support and engine hood 52 upon which an operator's seat 53 is mounted. Thus, the body structure is comprised of three rigidly interconnected parts; namely, a generally flat deck 54, the steering column support 42 and the combined seat support and engine hood 52.

Figure 2:
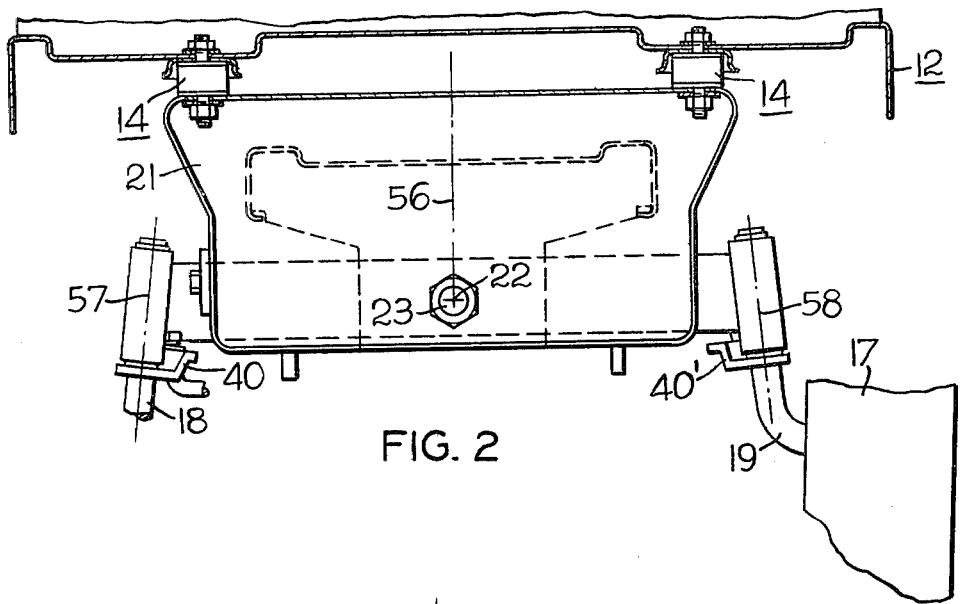
FIG. 2 is a view taken along the line II—II in FIG. 1.
Figure 3:
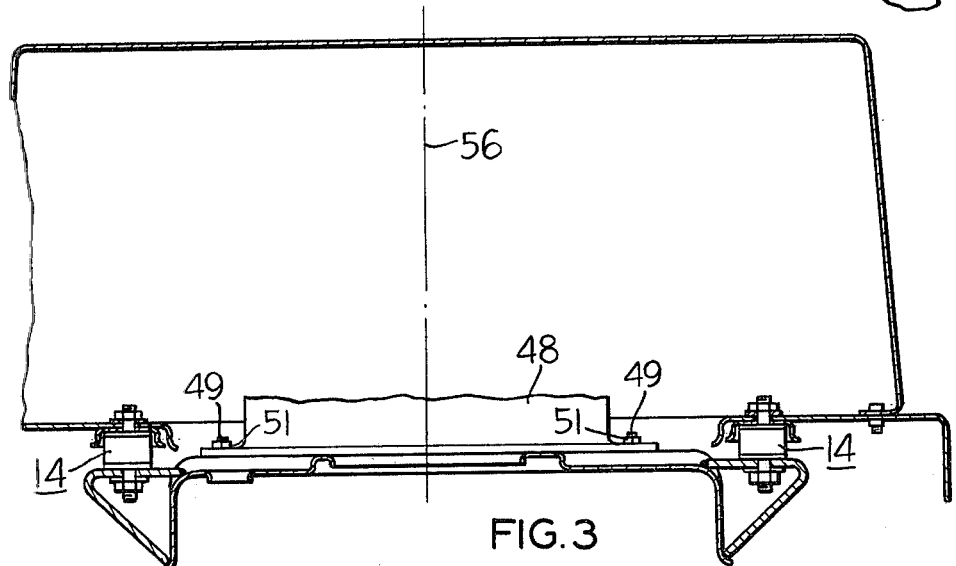
FIG. 3 is a view taken along the line III—III in FIG. 1.

As shown in FIGS. 2 and 8 the front pair of cushion mounts 14 are laterally spaced from one another on opposite sides of the central vertical plane 56 of the vehicle and are disposed above the front wheels 16, 17 and closely adjacent to their steering axes 57, 58. As shown in FIG. 1, the front cushion mounts 14 are in general vertical alignment with the front wall 21 of the main frame structure 13 and with the transverse rocking axle 20. The rear cushion mounts 14, as shown in FIGS. 1, 3 and 8, are also widely spaced on laterally opposite sides of the central longitudinal vertical plane 56 forwardly of the rear wheels 46, 47 and engine 48 and below the operator's seat 53.

Figure 4:
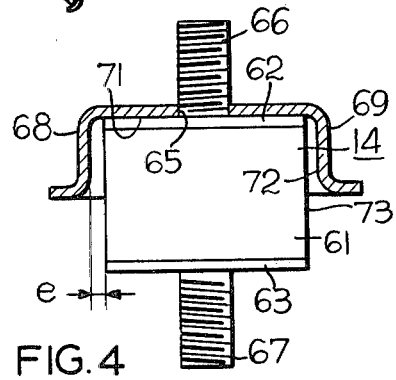
FIG. 4 is a view of a cushion mount used in the present invention with its cup part shown in section.
Figure 5:
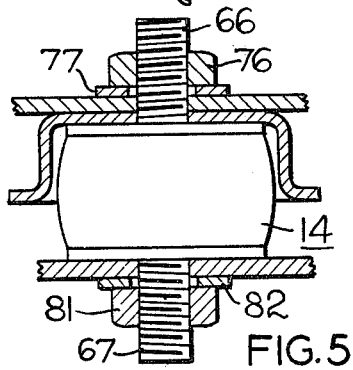
FIG. 5 is a view similar to FIG. 4 but showing the cushion mount installed and subjected to normal loading.

FIG. 4 shows the cushion mount 14 in a noninstalled condition and FIG. 5 shows the cushion mounts under normal loading. As illustrated each cushion mount 14 includes an upright cylindrical cushion 61 of relatively soft resilient rubber-like material of approximately 40 durometer the top and bottom flat surfaces of which are bonded to parallel upper and lower horizontal mounting plates 62, 63. Threaded studs 66, 67 are connected to the plates 62, 63, by suitable means, not shown. A restrainer in the form of an inverted annular cup 68, which has a vertical opening 65 through which the stud 66 extends, is positioned on top of the upper plate 62 with the top surface of the plate 62 abutting the inner flat surface 71 of the cup 68. The cup 68 includes a cylindrical wall 69 with a radially inward facing cylindrical surface 72 in horizontally confronting relation to the radially outer cylindrical surface 73 of the cushion 61. The cylindrical portion 69 is in horizontal confronting relation to approximately one-half of the height of the cushion 61 and is spaced a distance therefrom. The rubber-like material used for the cushion 61 is sufficiently soft to provide a soft ride for the operator of the riding mower; however, the softness of the cushion 61 presents several problems. When the mower negotiates a corner, the body structure sways excessively giving the operator a feeling of instability. Excessive sway also subjects the cushions to high shear loading with possible detrimental effect on the service life of the mounts. Further, the softness of the cushion 61 permits excessive radial deformation of the cushion when subjected to unusually high shock loading condition such as when inadvertently driving over a hidden depression in the lawn. The cup 68 solves both these problems by contacting the side of the cushion during a horizontal sway condition such as is illustrated in FIG. 6 thus stiffening the mount as the corner is turned. During excessive vertical loading the cylindrical walls of the cup contact the circumference of the cushion, when it bulges to the extent shown in FIG. 7, thereby stiffening the mount and confining the cushion to prevent its rupture.

As shown in FIG. 5, the upper end of the mount 14 is rigidly secured to the body structure by a nut 76 threaded onto the stud 66 with a washer 77 interposed between the nut and the upper side of the body structure 12. The lower end of the mount 14 is rigidly secured to the main frame structure 13 by a nut 81 screwed to the stud 67 and a washer 82 interposed between the nut 81 and the main frame structure 13.

From the foregoing description and the drawings, it is apparent that a highly effective sway resisting cushion support means has been provided for a rear engine riding lawn mower. A soft ride for the operator has been achieved together with excellent isolation from engine and main frame vibrations. The use of a restraining cup 68 on each cushion mount 14 is effective to resist horizontal sway of the body structure relative to the main frame structure when cornering and is also effective in stiffening and confining the cushion 61 when it is subjected to severe vertical loading. When the body structure 12 sways during cornering, the wall 69 will first make virtually a point contact with the cushion 61 then gradually increasing area contact with the cushion to give increasingly firm resistance to lateral sway of the body structure 12 relative to the main frame structure 13.

It will also be noted that the mower height control lever 94, the clutch lever 101 and steering shaft 31 are all mounted on the main frame structure 13 rather than on the body structure 12. The mounting of the controls of the main frame structure 13 measurably aids in isolating the body structure 12 from vibrations and shocks of the main frame structure 13.

The embodiments of the invention in which an exclusive property or privilege is claimed are defined as follows:

1. In a rear engine rider lawn mower vehicle the combination comprising:
   a main frame structure including
      a longitudinally and horizontally extending main frame and
      a transversely and vertically extending front wall rigidly secured to the front of said main frame,
   a transverse axle pivotally connected to said front wall for oscillating movement about a longitudinal axis,
   a pair of laterally spaced steerable wheels connected in supporting relation to laterally opposite ends of said axle,
   a pair of laterally spaced drive wheels in supporting relation to the rear end of said main frame,
   an upwardly extending steering shaft rotatably supported on the front end of the main frame having a manually operated steering wheel nonrotatably secured to its upper end,
   an engine mounted on the rear of said main frame,
   a body structure in overlying relation to said main frame structure,
   sleeve means on the front of said body structure slidably supporting said steering shaft to permit vertical movement of said body structure relative to said steering shaft,
   an operator's seat on said body structure forwardly of said engine and rear wheels,
   a first pair of laterally spaced cushion mounts between the front part of said body structure and the upper end of said front wall and
   a second pair of laterally spaced cushion mounts between the rear part of said main frame and the rear part of said body structure approximately vertically beneath said seat,
   each of said mounts including
      an upright cylindrical cushion of resilient rubber-like material of predetermined outer diameter and vertical dimension,
      upper and lower horizontal plates bonded, respectively, to the top and bottom surfaces of said cushion and secured, respectively, to said body and main frame structures and
      means for resisting lateral sway of said body structure and limiting radial expansion of said cushion including a restrainer mounted on said body structure and presenting wall means in horizontally confronting relation to the radially outward facing cylindrical surface of said cushion, said wall means extending vertically alongside a substantial portion of the height of said cushion and contacting the latter to resist lateral shifting movement of said body structure relative to said main frame structure and to limit radial expansion of said cushion when the latter is subjected to predetermined vertical loading.

2. The vehicle of claim 1 wherein a mower housing is mounted beneath said main frame structure and a lever for raising and lowering said mower housing is mounted on said main frame structure.

3. The vehicle of claim 2 wherein a clutch lever is mounted on said main frame structure.

* * * * *